US007367154B2

(12) United States Patent
Beauregard

(10) Patent No.: US 7,367,154 B2
(45) Date of Patent: May 6, 2008

(54) TRAP WITH BIASING DEVICE AND FORCE APPLYING LEVERS AND RELATED METHODS

(76) Inventor: Kurt D. Beauregard, 736 Saltspringville Rd., Fort Plain, NY (US) 13339

(*) Notice: Subject to any disclaimer, the term of this patent is extended or adjusted under 35 U.S.C. 154(b) by 42 days.

(21) Appl. No.: 10/955,611

(22) Filed: Sep. 30, 2004

(65) Prior Publication Data

US 2006/0064923 A1 Mar. 30, 2006

(51) Int. Cl.
*A01M 23/26* (2006.01)
*A01M 23/24* (2006.01)

(52) U.S. Cl. .......................................... 43/88; 43/96

(58) Field of Classification Search .................... 43/88, 43/90–96

See application file for complete search history.

(56) References Cited

U.S. PATENT DOCUMENTS 831,037 A * 9/1906 Campbell ...................... 43/96
912,348 A * 2/1909 Wright .......................... 43/88
1,048,075 A * 12/1912 Hughes ......................... 43/96
1,307,963 A * 6/1919 Elder ............................ 43/92
1,430,242 A * 9/1922 McMullen ..................... 43/88
1,563,772 A * 12/1925 May ............................. 43/90
1,890,377 A * 12/1932 Gibbs ........................... 43/88
1,912,457 A * 6/1933 Lehn ............................ 43/88
2,104,687 A * 1/1938 Zahm ........................... 43/88
2,216,919 A * 10/1940 Lehn ............................ 43/90
2,252,405 A * 8/1941 Navin ........................... 43/96
2,316,970 A * 4/1943 O'Neil .......................... 43/90
2,363,740 A * 11/1944 Melaas .......................... 43/88
2,406,180 A * 8/1946 Wampler et al. ............... 43/96
2,481,519 A * 9/1949 Johnson ......................... 43/88
2,541,771 A * 2/1951 Lazenby ........................ 43/92
2,543,826 A * 3/1951 Bigelow ........................ 43/90

(Continued)

FOREIGN PATENT DOCUMENTS

FR 2501469 A1 * 9/1982

(Continued)

*Primary Examiner*—Darren W. Ark
(74) *Attorney, Agent, or Firm*—Hoffman, Warnick & D'Alessandro LLC

(57) ABSTRACT

The present invention provides a force applying lever assembly for use with a foothold type trap. The force applying lever assembly has at least one force applying lever that is coupled to the biasing device or spring of the trap. The at least one force applying lever is also pivotally coupled to the base of the trap, allowing it to pivot with respect to the base. The trap's anchor, which is usually coupled to the base of the trap, is instead coupled to the end of the force applying lever opposite the base. When the ensnared animal pulls against the anchored trap, the pulling causes the force applying lever to pivot with respect to the base so as to increase the biasing force applied by the biasing device on the jaws. This additional biasing force on the jaws tightens the grip on the ensnared animal, which prevents it from escaping and discourages it from struggling. The increased biasing force in the biasing device caused by the pulling of the animal may also act as a shock absorber to prevent the animal from harming itself during the struggle. The invention also includes methods for building a trap having at least one force applying lever and for using such a trap for ensnaring an animal.

3 Claims, 12 Drawing Sheets

122A,B
110
124
140
128
172
136
126
142
20B
20A
174
160
170
162
150

U.S. PATENT DOCUMENTS 2,632,974 A * 3/1953 Cuvillier .......................... 43/92
2,680,930 A * 6/1954 Koch .......................... 43/95
2,772,510 A * 12/1956 Rogers .......................... 43/96
2,877,596 A * 3/1959 Elencik .......................... 43/88
2,996,829 A * 8/1961 Nolet .......................... 43/88
3,178,849 A * 4/1965 Pradon .......................... 43/96
3,335,517 A * 8/1967 Montgomery et al. .......... 43/92
4,033,067 A * 7/1977 Kuehl .......................... 43/90
4,065,871 A * 1/1978 Loeffler .......................... 43/88
4,117,621 A * 10/1978 Loeffler .......................... 43/88
4,117,622 A * 10/1978 Loeffler .......................... 43/88
4,127,959 A * 12/1978 Loeffler .......................... 43/88
4,161,080 A * 7/1979 Gabry .......................... 43/93
4,279,094 A * 7/1981 Beck .......................... 43/96
4,479,324 A * 10/1984 Askins .......................... 43/92
4,817,313 A * 4/1989 Falzon et al. .................. 43/88
5,109,627 A * 5/1992 Lee .......................... 43/88
2007/0245618 A1* 10/2007 Pedersen et al. ............... 43/90

FOREIGN PATENT DOCUMENTS

WO WO-86/04781 A1 * 8/1986

* cited by examiner

TRAP WITH BIASING DEVICE AND FORCE APPLYING LEVERS AND RELATED METHODS

BACKGROUND OF THE INVENTION

1. Technical Field

The present invention relates generally to ensnaring an animal, and more particularly, to ensnaring an animal more securely without harming the animal.

2. Related Art

Historically, one of the preferred ways to ensnare animals is with the use of traps. Modern traps fall into two main categories: kill-type traps and live-holding traps. Kill-type traps, such as the common mousetrap, are designed to quickly kill the captured animal, whereas live-holding traps are designed to capture the animal without killing or maiming it. Live-holding traps can be separated into box (cage-type) traps and foothold traps.

The foothold trap is one of the most common forms of animal trap. Foothold traps generally have two jaws that are closed by a biasing device when an animal steps on the trigger pan. The trap is usually buried in the ground just below the surface with a light coating of dirt or ground litter. A bait or lure is placed so that the animal must cross the trap in order to reach it. When the animal steps on the pan of the trap, the jaws are released to close and hold the animal. Foothold traps are designed to hold an animal by the leg just above the foot pad in order to prevent the animal from slipping the trap off its foot. Foothold traps may be designed to capture animals of almost any size by varying such parts of the trap as the type and biasing force of the biasing device or the spread of the jaws. Foothold traps are widely used because certain species cannot be effectively trapped otherwise without killing or maiming the animal.

FIGS. 1 and 2 show perspective views of a typical foothold type trap 10 in the set (FIG. 1) and sprung (FIG. 2) positions. Foothold trap 10 has a base 20 to which opposing jaws 22A, 22B are coupled, at least one trap lever 24, at least one biasing device 26, a pan 28 and a dog 30. Jaws 22 are usually movable between an opened position (FIG. 1) in which jaws 22 are spread apart, and a closed position (FIG. 2) in which jaws 22 are closed proximate to each other. Trap lever 24 is usually coupled to base 20 transverse to jaws 22 and has a trap lever support member 32 and an aperture 34. Trap lever 24 is usually movable between a set (FIG. 1) position in which trap lever 24 is in a first position and a sprung position (FIG. 2) in which trap lever 24 is rotated into a second position. Biasing device 26 may be a torsion spring as shown in FIGS. 1-2 or may be a compression spring, extension spring, leaf spring or any other device used for biasing. Biasing device 26 may be mounted on a corresponding biasing device pin 36 and is coupled to trap lever 24 at a first biasing device coupling point 40 and coupled to base 20 at a second biasing device coupling point 42. Dog 30 is coupled between base 20 and pan 28 adjacent to at least one of jaws 22A, 22B and acts to hold jaw 22A, 22B when jaw 22A, 22B is in the set position (FIG. 1).

FIG. 3 shows a side phantom view of a typical foothold type trap 10 in the set position. In this illustration, base 20A, 20B is in two parts. Biasing device 26 abuts base 20A at second biasing device coupling point 42 and abuts lever 24 at first biasing device coupling point 40. In the set position, biasing device 26 has a biasing force and applies a force 44 on lever 24. However, lever 24 remains in the set position because dog 30 holds jaws 22A, 22B in the open position (FIG. 1).

FIG. 4 shows a side phantom view of a typical foothold type trap 10 in the sprung position. In this illustration, dog 30 is displaced by an animal (not shown) depressing pan 28, such as by stepping on pan 28. The force of biasing device 26 on trap lever 24 moves trap lever from the set position into the closed position, forcing jaws 22A, 22B to close (FIG. 2) on the leg of the animal, ensnaring the animal.

Returning to FIG. 1, trap 10 is usually anchored to a fixed object (not shown) using an anchor 50, which is usually coupled to base 20. Anchor 50 may have a fastener 52 to fasten anchor 50 to the fixed object. Additionally, anchor may have a swivel 54 to allow trap 10 to pivot with respect to the fixed object and a tag 56 to provide information regarding trap 10.

One shortcoming in the art has been an inability to effectively secure an animal with a foothold trap without harming it. An animal that is ensnared in a foothold trap will often try to pull its foot out of the trap. This pulling may result in the animal escaping the trap or in the animal injuring itself because the trap is normally anchored to a fixed object. This pulling usually occurs during a period of struggle immediately after the animal becomes ensnared and again when the trapper arrives to check the trap. During this struggle the animal may generate a large amount of force by pulling or running away from the point to which the trap is anchored. When the slack in the anchor, usually a rope or chain, runs out, the motion of the animal may be halted abruptly. As stated above, this abrupt halt may cause the animal to escape, depriving the trapper of his catch, or the animal to become injured. An injury to an animal may reduce the value to the trapper. Additionally, it is undesirable for an ensnared animal to be injured if the animal is a domestic animal, such as a dog, or any other animal that the trapper does not wish to trap.

In view of the foregoing, there is a need in the art for a trap that lessens the possibility that an animal will escape or injure itself after being ensnared in a trap.

SUMMARY OF THE INVENTION

The present invention provides a force applying lever assembly for use with a foothold type trap. The force applying lever assembly has at least one force applying lever that is coupled to the biasing device or spring of the trap. The at least one force applying lever is also pivotally coupled to the base of the trap, allowing it to pivot with respect to the base. The trap's anchor, which is usually coupled to the base of the trap, is instead coupled to the end of the force applying lever opposite the base. When the ensnared animal pulls against the anchored trap, the pulling causes the force applying lever to pivot with respect to the base so as to increase the biasing force applied by the biasing device on the jaws. This additional biasing force on the jaws tightens the grip on the ensnared animal, which prevents it from escaping and discourages it from struggling. The increased biasing force in the biasing device caused by the pulling of the animal may also act as a shock absorber to prevent the animal from harming itself during the struggle. The invention also includes methods for building a trap having at least one force applying lever and for using such a trap for ensnaring an animal.

In a first embodiment is disclosed a system for securing an ensnared animal in an anchored trap having a base, first and second jaws for securing the ensnared animal and a biasing device configured to bias the jaws to a closed position under a biasing force, the system comprising: a force applying lever pivotally coupled to the base and operatively coupled to the biasing device such that a pulling by the ensnared animal causes the force applying lever to pivot so as to increase the biasing force applied by the biasing device, thereby further securing the ensnared animal.

In a second embodiment is disclosed a force applying lever for use with an anchored trap for ensnaring an animal, the trap having a base, a first and second jaws for securing the ensnared animal and a biasing device configured to bias the jaws to a closed position under a biasing force, the lever comprising: means for pivotally coupling the lever to the base; means for coupling the lever to an anchor of the trap; and means for increasing the biasing force in the case that the ensnared animal pulls the trap relative to the anchor.

In a third embodiment is disclosed a force applying lever for use with an anchored trap for ensnaring an animal, the trap having a base, a first and second jaws for securing the ensnared animal and a biasing device configured to bias the jaws to a closed position under a biasing force, the lever comprising: a base coupler for pivotally coupling the lever to the base; an anchor coupler for coupling the lever to an anchor of the trap; and an engager configured to increase the biasing force in the case that the ensnared animal pulls the trap relative to the anchor.

In a fourth embodiment is disclosed a trap for ensnaring an animal and anchored using an anchor, the trap comprising: a base; first and second jaws for securing the ensnared animal; a biasing device for biasing the first and second jaws to a closed position under a biasing force; and a force applying lever for increasing the biasing force in response to pulling of an ensnared animal on the trap.

In a fifth embodiment is disclosed a trap for ensnaring an animal, the trap comprising: a base; an anchor for anchoring the base to a fixed object; first and second jaws for securing the ensnared animal pivotally coupled to the base; means for biasing the first and second jaws to a closed position under a biasing force; and means for increasing the biasing force in response to pulling of an ensnared animal on the trap.

In a sixth embodiment is disclosed a method for building a trap designed to be anchored using an anchor and used for ensnaring an animal, the method comprising the steps of: providing a trap having a base, first and second jaws for securing the ensnared animal and at least one biasing device for biasing the jaws to a closed position under a biasing force; coupling at least one force applying lever pivotally to the base; and operationally connecting the at least one force applying lever to the corresponding at least one biasing device such that a force applied to the at least one force applying lever away from the trap causes the at least one force applying lever to pivot so as to increase the biasing force applied by the at least one biasing device.

In a seventh embodiment is disclosed a method for ensnaring an animal, the method comprising: setting a trap having a base, first and second jaws for securing the ensnared animal, a biasing device for biasing the jaws to a closed position under a biasing force and a force applying lever operationally coupled to the biasing device and pivotally coupled to the base for increasing the biasing force in response to pulling by an ensnared animal; anchoring the trap with an anchor coupled to the force applying lever; ensnaring the animal; and increasing the biasing force in the biasing device in response to pulling by the ensnared animal thereby further securing the ensnared animal.

The foregoing and other features of the invention will be apparent from the following more particular description of embodiments of the invention.

BRIEF DESCRIPTION OF THE DRAWINGS

The embodiments of this invention will be described in detail, with reference to the following figures, wherein like designations denote like elements, and wherein.

DETAILED DESCRIPTION OF THE INVENTION

Force Applying Lever Assembly

Figure 4:
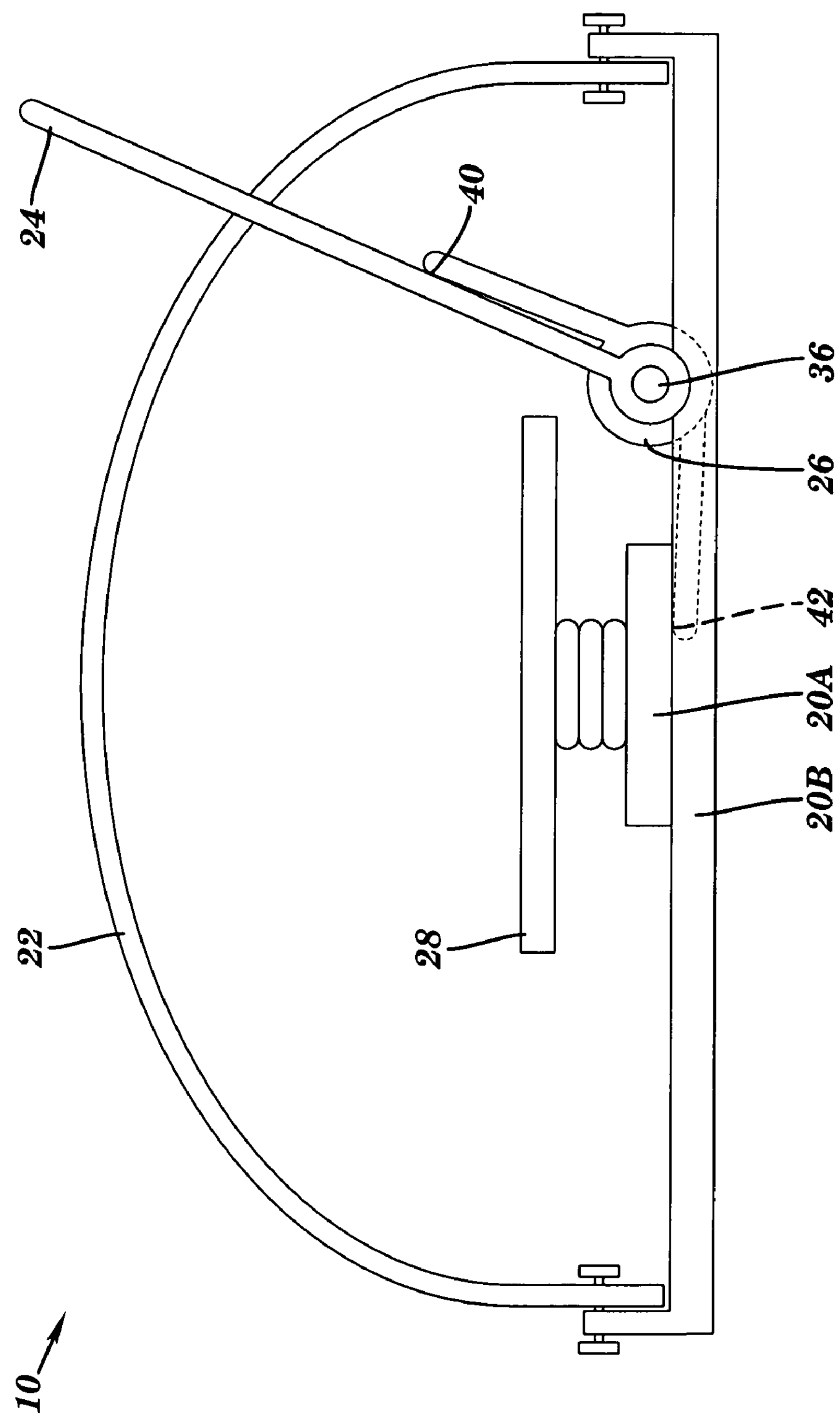
FIG. 4 shows a side phantom view of a typical foothold type trap with jaws in a sprung position.
Figure 5:
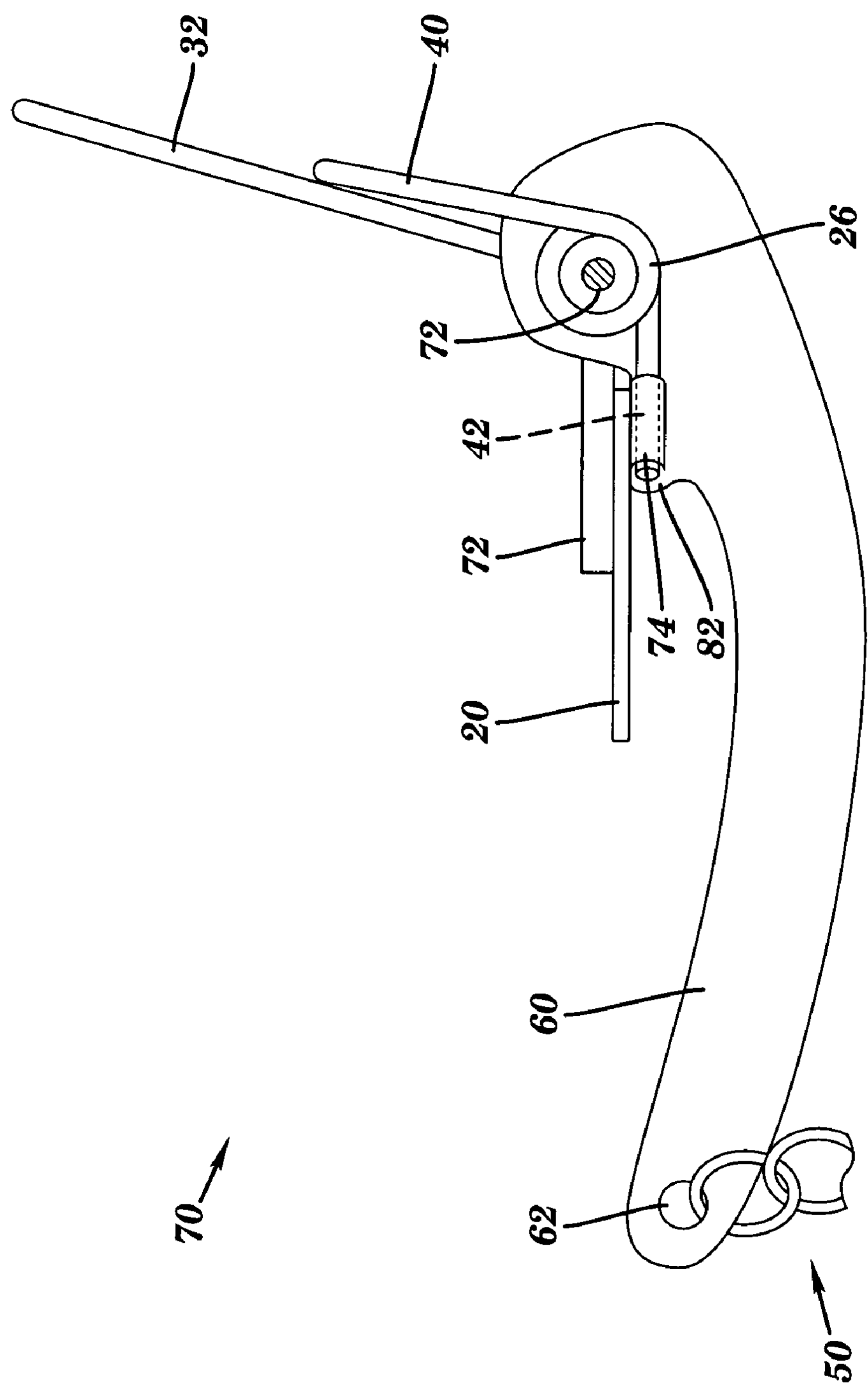
FIG. 5 shows a side view of a force applying lever assembly according to the invention.
Figure 6:
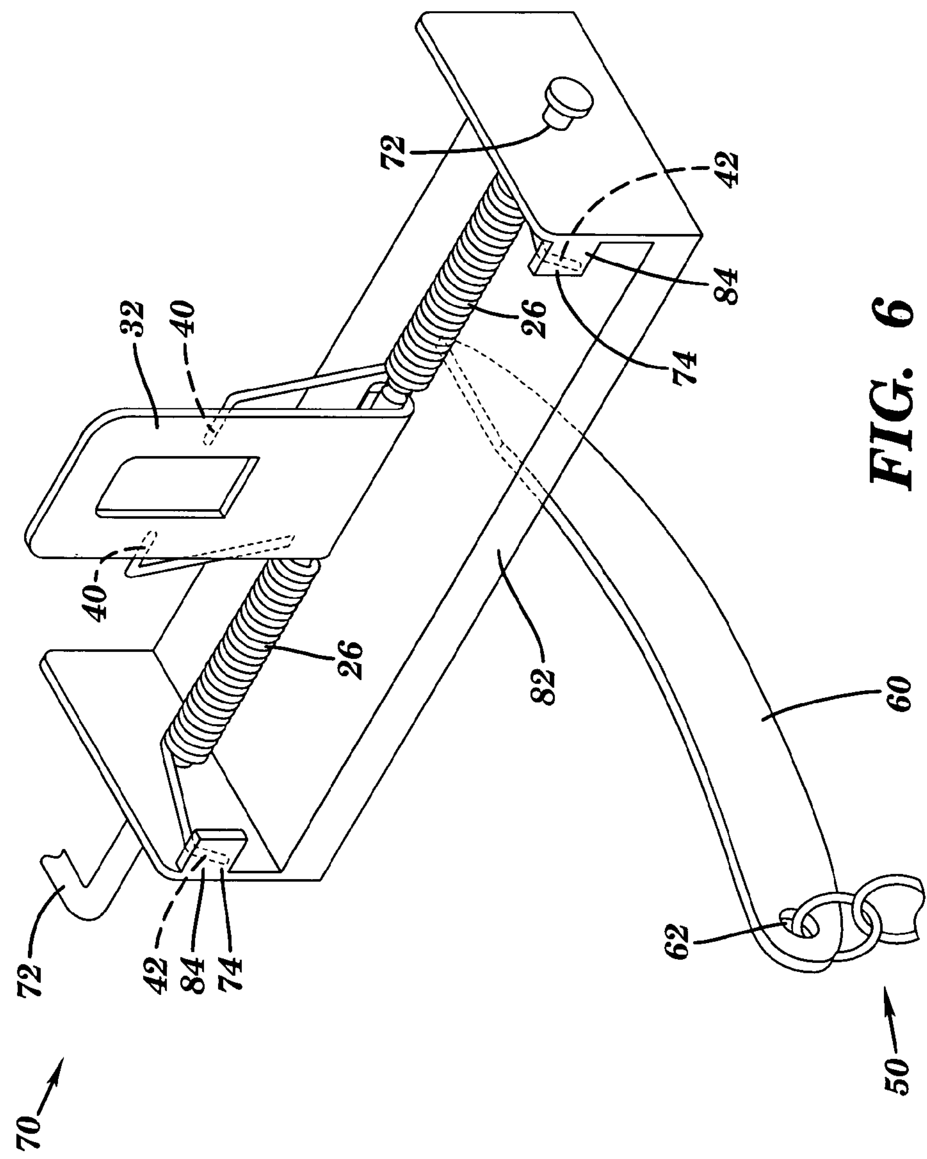
FIG. 6 shows a perspective view of a force applying lever assembly according to the invention.

FIGS. 5 and 6 show a force applying lever assembly 70 according to the invention. Force applying lever assembly is adapted for use with trap 10 (FIGS. 1-4) for ensnaring an animal and includes a force applying lever 60 for increasing the biasing force of the trap. Force applying lever assembly 70 also has a base coupler 72 for pivotally coupling force applying lever 60 to base 20 of trap 10. Base coupler 72 may be adapted to couple using biasing device pin 36 of trap 10 (FIGS. 1-4), a screw, hinge, ball and socket, pin or any other device for pivotally coupling now known or later developed in the art. Base coupler 72 allows force applying lever 60 to pivot with respect to trap 10 as will be described in more detail below.

Force applying lever assembly 70 also has a biasing device coupler 74 for coupling force applying lever 60 to biasing device 26. Biasing device coupler 74 may include a u-shaped groove 82 as illustrated in FIG. 5, an angled piece 84 as shown in FIG. 6, a screw, sleeve, clamp, weld or any other device for coupling now known or later developed. As illustrated in FIG. 5, biasing device coupler 74 may be situated between biasing device 26 and base 20 at second biasing device coupling point 42, which causes biasing device 26 to exert force against force applying lever 60 rather than against base 20. As in trap 10 (FIGS. 1-4), biasing device 26 continues to exert a force upon trap lever 32 at first biasing device coupling point 40 to move trap lever 32 from the set (FIGS. 1, 3) to the sprung (FIGS. 2, 4) position.

Force applying lever assembly 70 may also have an anchor coupler 62 for coupling force applying lever 60 and anchor 50. Anchor coupler 62 may be an aperture as shown in FIGS. 5-6, or may be a clamp, fastener, weld, screw, pin or any other device for coupling now known or later developed in the art.

Figure 1:
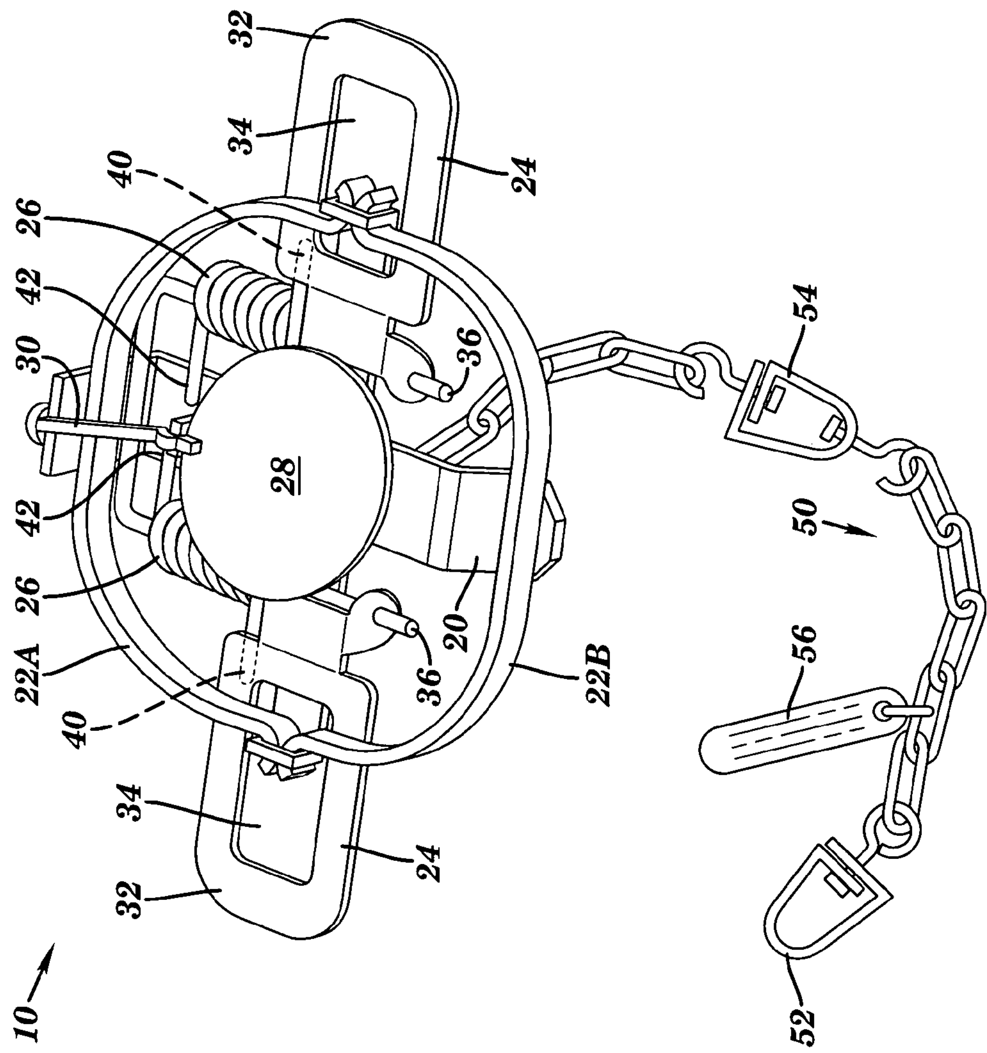
FIG. 1 shows a perspective view of a typical foothold type trap with jaws in a set position.
Figure 2:
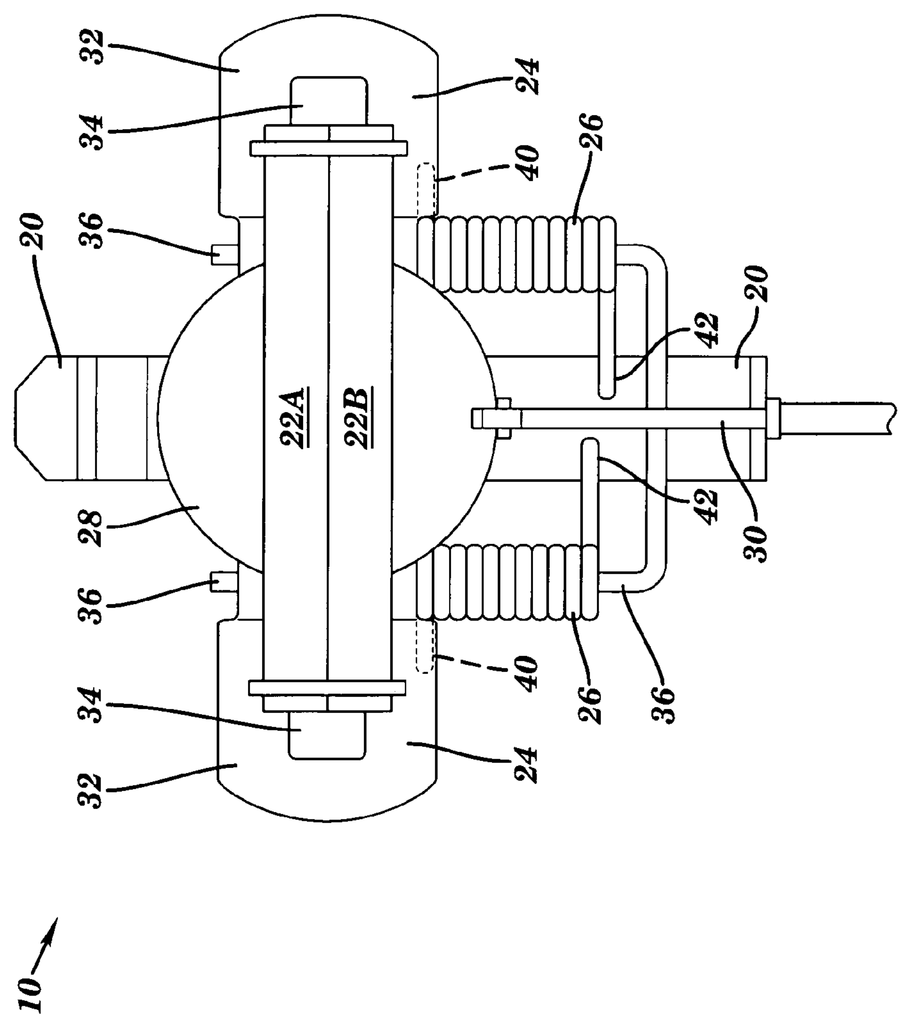
FIG. 2 shows a perspective view of a typical foothold type trap with jaws in a sprung position.
Figure 3:
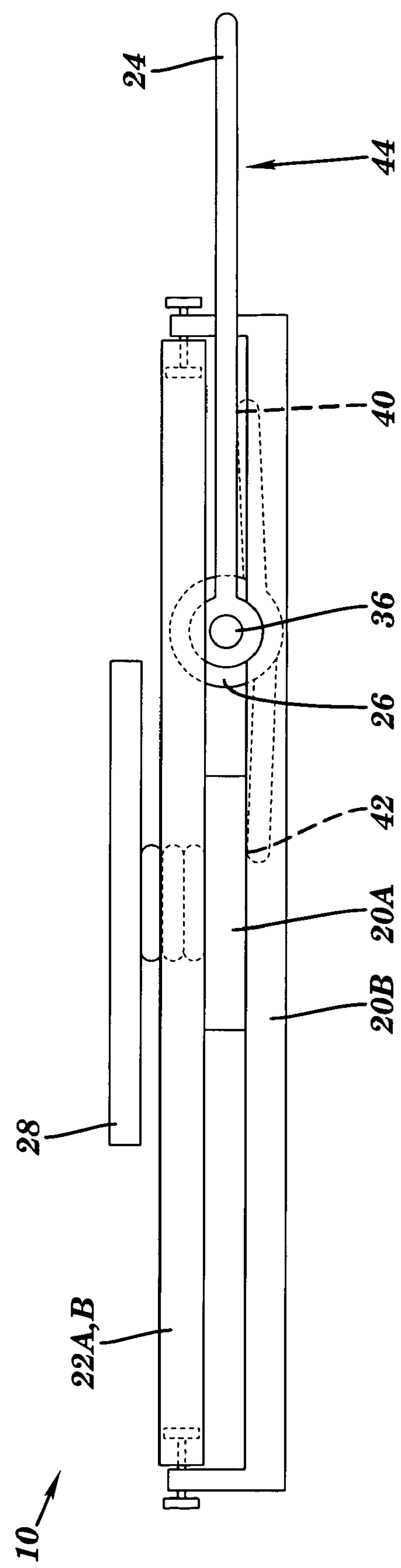
FIG. 3. shows a side phantom view of a typical foothold type trap with jaws in a set position.

Force applying lever assembly 70, when coupled to a trap such as trap 10 (FIGS. 7-9) adds force to the force of biasing device 26 in the case that an ensnared animal pulls trap 10 with respect to anchor 50. This is accomplished by the pivoting of force applying lever 60 with respect to base 20 using base coupler 72 when force is applied at anchor coupler 62. This pivoting causes biasing device coupler 72 to move with second coupling point 42 of biasing device 26 away from base 20, increasing biasing force in biasing device 26. The increased biasing force in biasing device 26 increases the force exerted upon trap lever 32 at first biasing device coupling point 40, which may move trap lever 32 further into the sprung position (FIGS. 2, 4). Conversely, when the ensnared animal ceases pulling, the release of force at anchor coupler 62 causes biasing device 26 to pivot force applying lever 60 so that force applying lever assembly 70 is back in the original position with respect to base 20 (FIG. 5). The resulting release in the biasing force of biasing device 26 lessens the force on lever 32 at first biasing device coupling point 40 and causes lever 32 to move back toward the set position. The relative positions, shapes and sizes of the various members are for the purpose of illustration and are not meant to be in any way limiting.

Foothold Type Trap with Single Force Applying Lever

Figure 7:
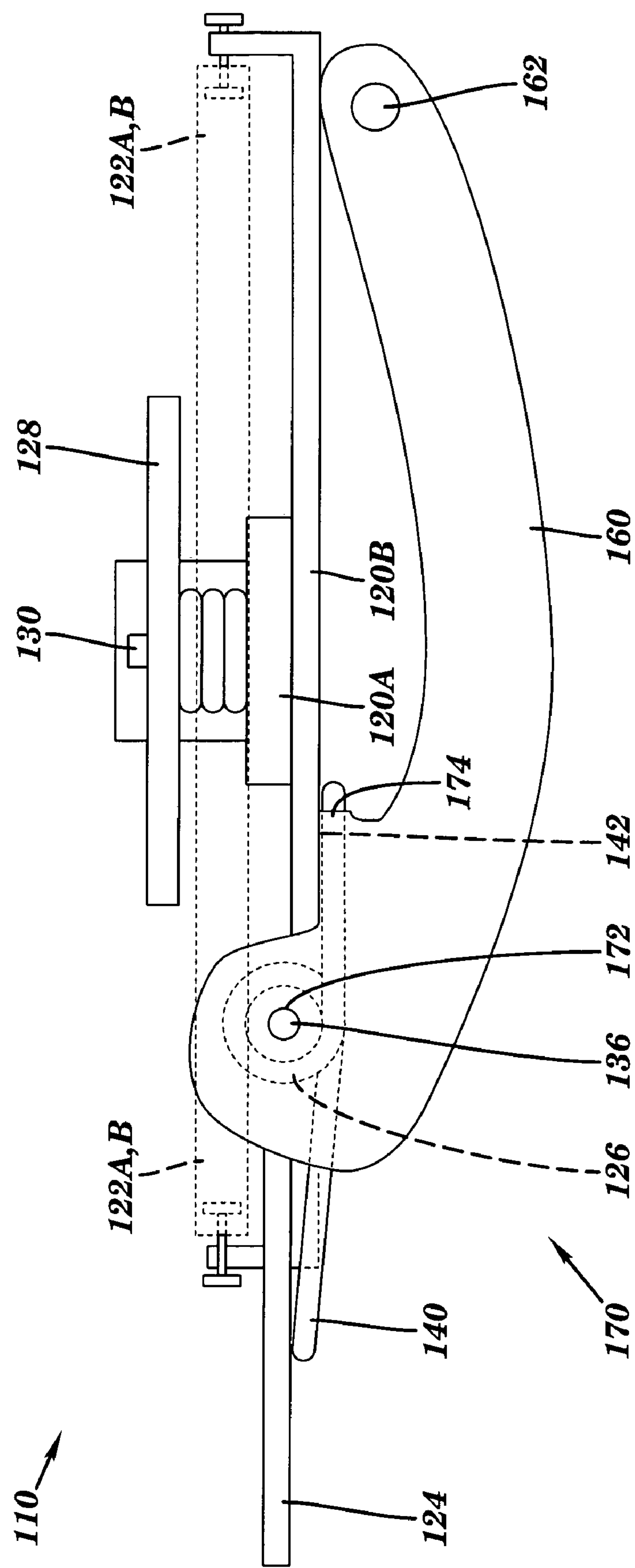
FIG. 7 shows a side view of a trap having a force applying lever assembly according to the invention with one force applying lever wherein the trap is in a set position.
Figure 8:
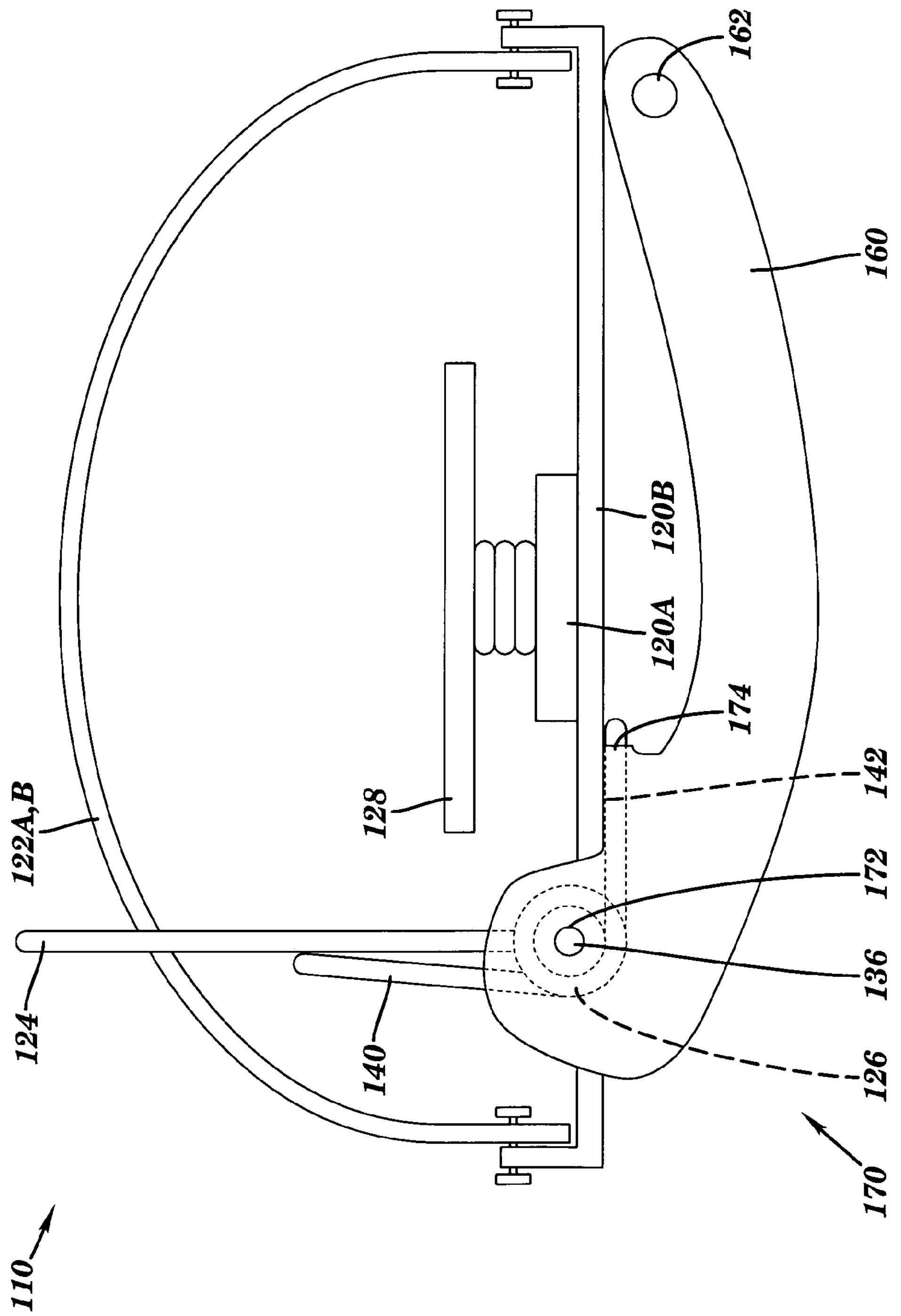
FIG. 8 shows a side view of a trap having a force applying lever assembly according to the invention with one force applying lever wherein the trap is in a sprung position and the animal is not pulling.
Figure 9:
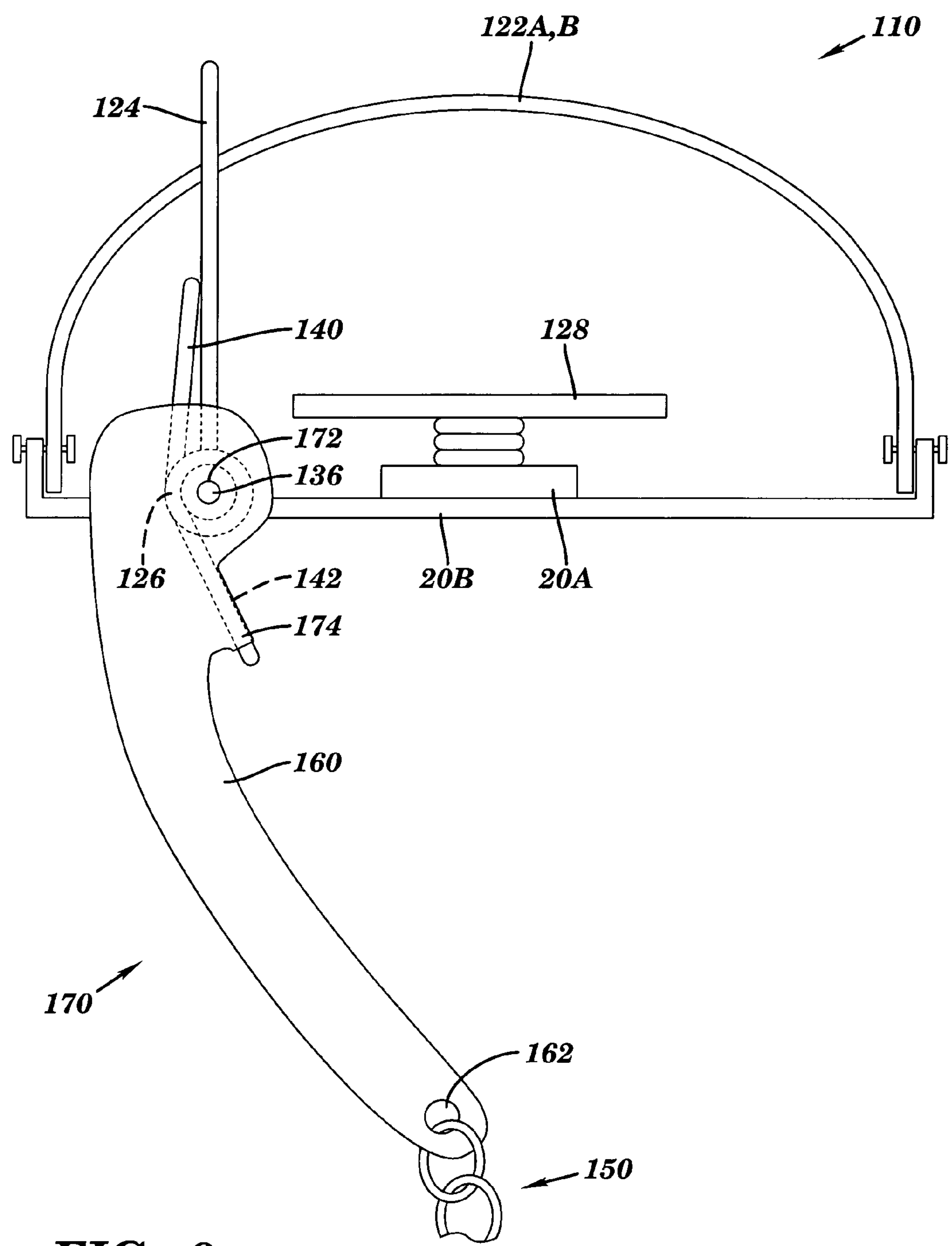
FIG. 9 shows a side view of a trap having a force applying lever assembly according to the invention with one force applying lever wherein the trap is in a sprung position and the animal is pulling.

FIGS. 7-9 show side views of a trap 110 having a force applying lever assembly 170 according to the invention with one force applying lever 160. Trap 110 has a base 120A, 120B, a first and second jaws 122 for securing the ensnared animal and a biasing device 126. Force applying lever assembly 170 includes force applying lever 160, base coupler 172, biasing device coupler 174 and anchor coupler 162. Force applying lever 160 is pivotally coupled to base 120A, 120B with base coupler 172. Force applying lever 160 may be coupled to base 120A, 120B using biasing device pin 136 as shown, or to any other part of base 120A, 120B, and may be pivotally coupled using a hinge, pin, ball and socket, or by any other means now known or later developed in the art. Force applying lever 160 is also coupled to biasing device 126 with biasing device coupler 174 at a second biasing device coupling point 142 opposite the coupling of biasing device 126 at a first biasing device coupling point 140. In one embodiment, biasing device 126 is coupled at first biasing device coupling point 140 to trap lever 124, although biasing device 126 may also be coupled to jaws 122A, 122B or to any other place on trap 110.

Trap 110 is designed to be anchored to a fixed object (not shown) using an anchor 150 (FIG. 9). In one embodiment, anchor 150 is coupled to force applying lever 160 with an anchor coupler 162. Anchor 150 may be a chain as shown in FIG. 9 or may be a rope, cord, biasing device or any other means of anchoring now known or later developed in the art. Fixed object may be a stake, rock, plant, manmade structure or any other relatively fixed point that may be used for anchoring that is now known or later developed in the art.

FIG. 7 shows trap 110 with force applying lever assembly wherein trap 110 is in the set position. Biasing device 126 exerts a force upon trap lever 124 at first biasing device coupling point 140. Trap lever, in turn, exerts a force upon jaws 122A, 122B, which are restrained by a dog 130. Biasing device 126 also exerts a force upon biasing device coupler 174 of force applying lever assembly 170 at second biasing device coupling point 142. This force keeps force applying lever 160 in a relatively horizontal position with respect to base 120 of trap 110.

FIGS. 8-9 show trap 110 with force applying lever assembly 170 according to the invention, wherein trap 110 is in the sprung position. When dog 130 (FIG. 7) is displaced, such as by an animal (not shown) stepping on pan 128, the force of biasing device 126 upon trap lever 124, causes trap lever 124 to move from the set position (FIG. 7) toward the sprung position. The force of trap lever 124 upon jaws 122A, 122B, in turn, causes jaws 122A, 122B to move from the open position to the closed position, ensnaring the animal.

FIG. 8 shows sprung trap 110 with force applying lever assembly 170 according to the invention, in the case that the ensnared animal is not pulling the trap with respect to anchor 150 (FIG. 9). Because the ensnared animal is not pulling, there is no force at anchor coupler 162. In this situation, the force of biasing device 126 at second biasing device coupling point 142 keeps force applying lever 160 in a relatively horizontal position with respect to base 120A, 120B.

FIG. 9 shows sprung trap 110 with force applying lever assembly 170 according to the invention, in the case that the ensnared animal pulls the trap with respect to anchor 150. The pulling of the ensnared animal causes a force at anchor coupler 162 that causes force applying lever 160 to pivot on base coupler 172 with respect to base 120A, 120B. The pivoting of force applying lever 160 causes biasing device coupler 174 to move biasing device 126 at first biasing device coupling point 142, increasing the biasing force in biasing device 126. This increase in biasing force causes the force of biasing device 126 against trap lever 124 at first biasing device coupling point 140 to increase, moving trap lever 124 further toward the sprung position. The movement of trap lever 124, in turn causes jaws 122A, 122B to be biased still further, tightening the grip on the animal's foot or leg and thereby further securing the ensnared animal. When the animal ceases to pull and the force at anchor coupler 162 is removed, force applying lever 160 pivots in the opposite direction, ceasing the increased biasing force in biasing device 126, moving trap lever 124 back toward the set position and loosening the force of the grip of jaws 122A, 122B on the foot of the ensnared animal.

The tightening of the force of the grip of jaws 122A, 122B during the pulling of the animal and loosening of the force of the grip of jaws 122A, 122B in the absence of pulling may serve to discourage the animal from struggling and keep it from injuring itself. Furthermore, the pivoting of force applying lever 160 combined with the increase and decrease of biasing force in biasing device 122 also helps trap 110 with force applying lever assembly 170 to prevent the animal from harming itself during the struggle by absorbing a portion of the shock caused by the pulling of the animal.

Foothold Type Trap with Multiple Force Applying Levers

Figure 10:
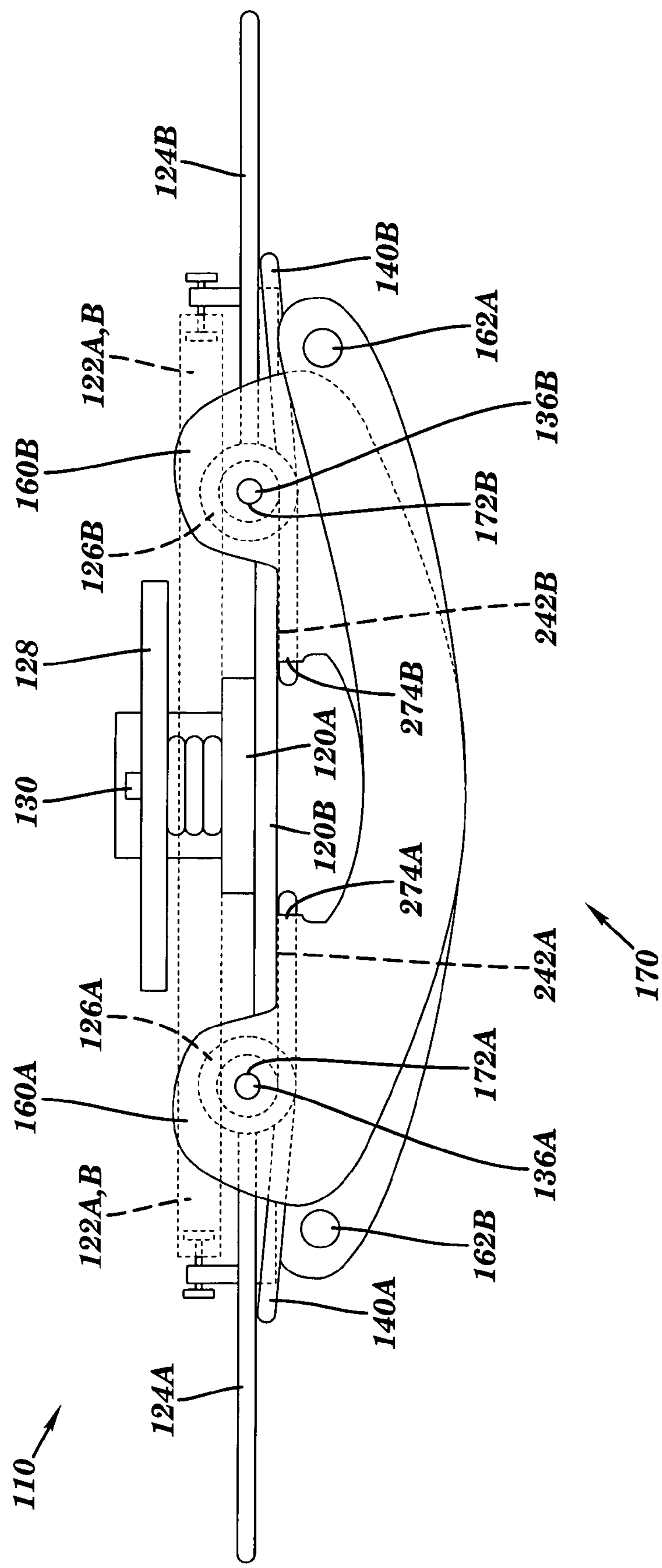
FIG. 10 shows a side view of a trap having a force applying lever assembly according to the invention with multiple force applying levers wherein the trap is in a set position.
Figure 11:
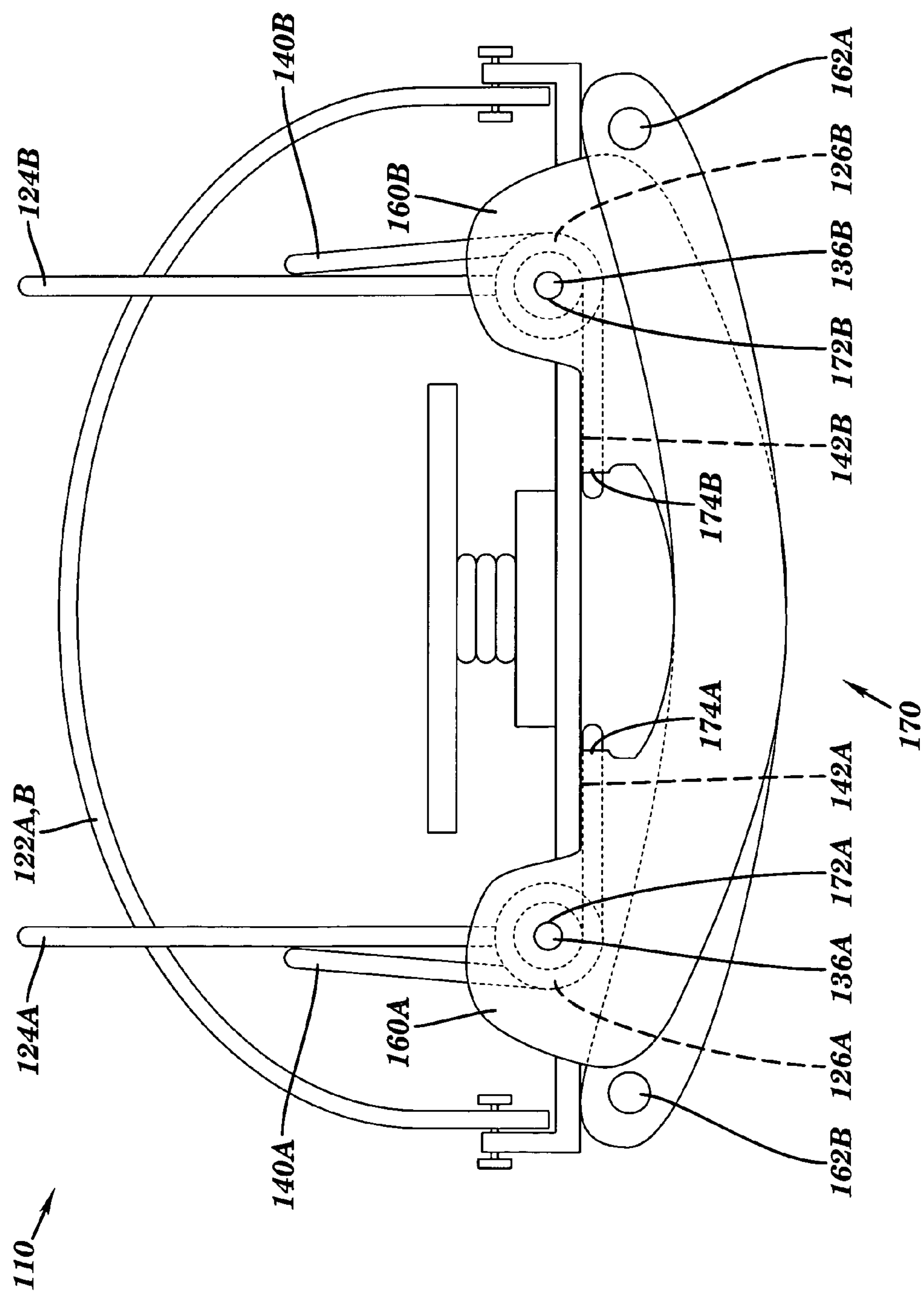
FIG. 11 shows a side view of a trap having a force applying lever assembly according to the invention with multiple force applying levers wherein the trap is in a sprung position and the animal is not pulling.
Figure 12:
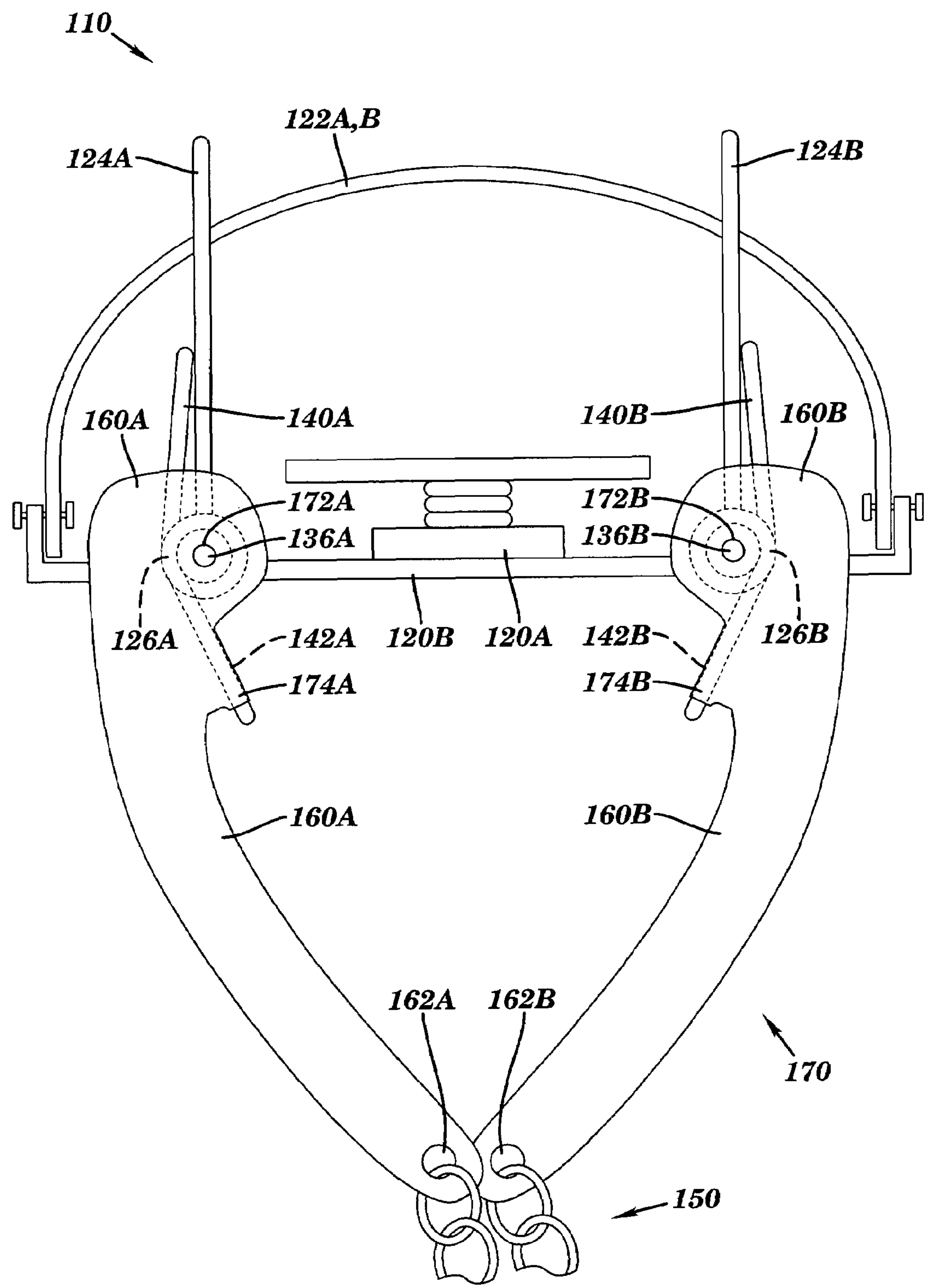
FIG. 12 shows a side view of a trap having a force applying lever assembly according to the invention with multiple force applying levers wherein the trap is in a sprung position and the animal is pulling.

FIGS. 10-12 show side views of a trap 110 having a force applying lever assembly 170 according to the invention with multiple force applying levers 160A, 160B. The functions of the elements described in FIGS. 10-12 correspond to those in FIGS. 7-9 with similar elements having similar numbers and multiple elements designated with the letters A and B.

Method for Building Foothold Type Trap with Force Applying Lever

A method will now be described for building a trap that is designed to be anchored using an anchor and used for ensnaring an animal, such as the traps illustrated in FIGS. 7-12. A first step includes providing a trap having a base, a first and second jaws for securing the ensnared animal and at least one biasing device for biasing the jaws to a closed position under a biasing force. The trap may be a trap such as the ones illustrated in FIGS. 1-4 or may be any other suitable trap now known or later developed in the art. Furthermore, the trap may be assembled partially or in full by the builder of the claimed invention or may be acquired from an outside source.

A second step includes coupling at least one force applying lever assembly pivotally to the base of the trap. Force applying lever assembly may have pivotal coupler for coupling force applying lever and base that may include a biasing device pin such as illustrated in FIGS. 5-12 or may utilize any other method of pivotally coupling now known or later developed in the art. Additionally, pivotally coupling step may utilize one force applying lever as illustrated in FIGS. 7-9, or multiple force applying levers as shown in FIGS. 10-12. Additionally, the force applying levers may be similar to those in force applying lever assembly 70 (FIGS. 4-5) or any shape, size or style of force applying lever that performs the required function.

A third step includes operationally connecting the at least one force applying lever assembly to the corresponding at least one biasing device. Force applying lever assembly may have biasing device coupler for coupling force applying lever and biasing device such as illustrated in FIGS. 5-12 or may utilize any other method of coupling now known or later developed in the art. Biasing device may also be coupled to another portion of the trap such as trap lever 32, 132, 132A, 132B (FIGS. 1-12) such that a force applied to the at least one force applying lever away from the trap causes the at least one force applying lever to pivot so as to increase the biasing force in the at least one biasing device. As stated above this further ensnares the animal without harming it, discourages further struggle and provides a shock absorber to minimize the possibility that the ensnared animal will harm itself.

Method for Ensnaring Using Foothold Type Trap with Force Applying Lever

A method will now be described for ensnaring an animal using a trap having a force applying lever assembly such as the one illustrated in FIGS. 4-5. A first step includes setting a trap having a base, a first and second jaws for securing the ensnared animal, a biasing device for biasing the jaws to a closed position under a biasing force and a force applying lever coupled to the biasing device and pivotally coupled to the base for increasing the biasing force in response to pulling by an ensnared animal. Trap may be of the type illustrated in FIGS. 7-12 and force applying lever may be of the type illustrated in FIGS. 5-6 although other types are envisioned. Setting the trap may include depressing the trap lever into the set position, moving the jaws into the open position (FIGS. 7 and 10) and positioning the dog to hold the jaws in the open position.

A second step includes anchoring the trap with an anchor coupled to the force applying lever assembly. Force applying lever assembly may include an anchor coupler for coupling force applying lever and anchor as illustrated in FIGS. 5-12 or may utilize any other method of coupling now known or later developed in the art. As stated above, anchor may include any device for anchoring now known or later developed in the art. Anchor may also be anchored to a fixed object, which may be any relatively fixed point of the kind described above.

A third step includes ensnaring the animal. As indicated above, this may occur when the animal depresses the pan, such as by stepping on the pan, and the dog that holds the jaws in the open position is displaced. The biasing device may then bias the jaws to a closed position under a biasing force, ensnaring the animal.

A fourth step includes increasing the biasing force in the biasing device in response to pulling by the ensnared animal. Force applying lever may pivot in response to the pulling of the animal, increasing the biasing force in the biasing device, thereby further biasing the first and second jaws to the closed position, and thereby further securing the ensnared animal. This provides the user with an undamaged animal.

While this invention has been described in conjunction with the specific embodiments outlined above, it is evident that many alternatives, modifications and variations will be apparent to those skilled in the art. Accordingly, the embodiments of the invention as set forth above are intended to be illustrative, not limiting. Various changes may be made without departing from the spirit and scope of the invention as defined in the following claims.

What is claimed is:

1. A trap for ensnaring an animal, the trap comprising:

a base;

an anchor for anchoring the base to a fixed object;

first and second jaws for securing the ensnared animal pivotally coupled to the base and movable between opened and closed positions;

a trap lever for forcing the first and second jaws into the closed position, the trap lever rotatably coupled to the base and movable between a set position and a closed position, the trap lever having an opening defined therein through which the first and second jaws pass when moving from the set position to the closed position;

means for biasing the first and second jaws to the closed position and the trap lever to the closed position under a biasing force, wherein the means for biasing includes at least one torsion spring having first and second ends;

means for increasing the biasing force in response to pulling of an ensnared animal on the trap, wherein the means for increasing is directly coupled to the means for biasing, the means for increasing the biasing force comprising a force applying lever having a first end and a second end, wherein the first end of the at least one torsion spring engages the first end of the force applying lever, and wherein the second end of the at least one torsion spring engages the trap lever so that the at least one torsion spring acts between the trap lever and the force applying lever.

2. The trap of claim 1, wherein the means for increasing biasing force ceases increasing the biasing force in response to cessation of pulling by the ensnared animal.

3. A trap comprising:

a base;

a first and a second jaw, for securing an ensnared animal, pivotally coupled to the base and movable between opened and closed positions;

a trap lever for forcing the first and second jaws into the closed position, the trap lever rotatably coupled to the base and movable between a set position and a closed position, the trap lever having an opening defined therein through which the first and second jaws pass when moving from the set position to the closed position;

a biasing device for providing a first biasing force to bias the first and the second jaw from an open position to a closed position upon an activation of the trap, wherein the biasing device comprises at least one torsion spring having first and second ends;

a force applying lever having a first end and a second end, wherein the first end is coupled with the biasing device so that the force applying lever remains in a first position upon the activation of the trap, wherein the first end of the at least one torsion spring engages the first end of the force applying lever, and wherein the second end of the at least one torsion spring engages the trap lever so that the at least one torsion spring acts between the trap lever and the force applying lever; and an anchor coupled to the second end of the force applying lever, for anchoring the trap to a fixed object, wherein a pulling by the ensnared animal against the anchor causes a lever action of the force applying lever from the first position to a second position, thereby causing an increase in the biasing force from the first biasing force to a second biasing force applied by the biasing device against the first and the second jaw, thereby further securing the ensnared animal in the trap.

* * * * *